Patented Nov. 22, 1949

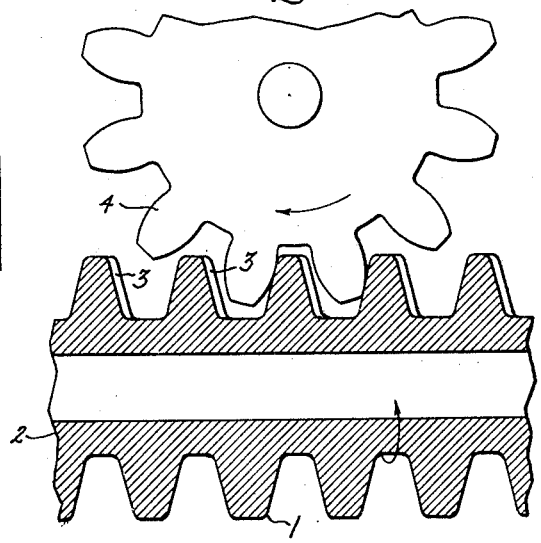
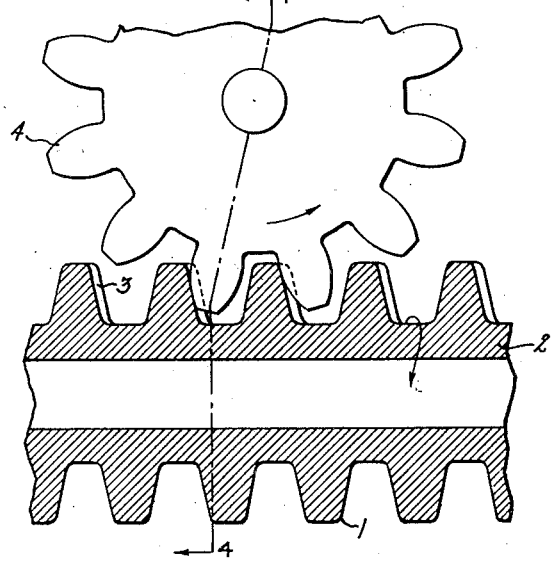
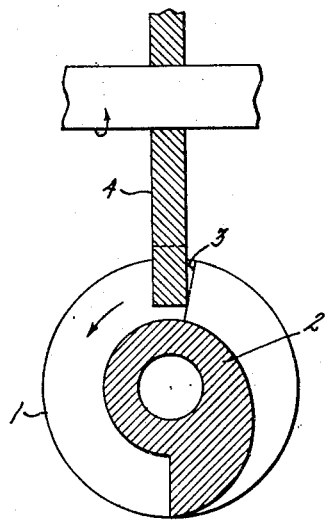
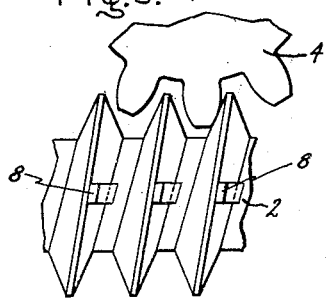

2,489,077

UNITED STATES PATENT OFFICE 2,489,077

ONE-WAY WORM GEAR LOCK

Robert L. Boyles, Framingham, Mass., assignor to Telechron, Inc., a corporation of Maine Application November 24, 1948, Serial No. 61,767

2 Claims. (Cl. 74—458)

My invention relates to a one-way lock for worm gearing and is useful in synchronous motor clock drives, for example, where the synchronous motor is of a type that starts equally well in either direction and drives the clock through reduction gearing including the worm gear of my invention. In such application of my invention the one-way locking worm gear is arranged to block rotation in the wrong direction of rotation.

The features of my invention which are believed to be novel and patentable will be pointed out in the claims appended hereto. For a better understanding of my invention reference is made in the following description to the accompanying drawing in which Fig. 1 shows a side view of a worm gear driving member with its teeth provided with locking steps on one side. Fig. 2 shows such a worm in nonlocking driving relation with a driven pinion, the worm being shown in cross section. Fig. 3 is a similar view but with the gearing in locking relation. Fig. 4 is a section on line 4—4, Fig. 3, and Fig. 5 is a modification. Referring to Fig. 1, I represents a worm cut on a hub 2. At one point about the periphery of the teeth they are provided with a projection or step 3 on one side. It is not necessary for the faces of these steps to be radial as shown in Fig. 4. Considerable variation is permissible as long as a wedging action does not take place. These steps in the several teeth or continuous tooth are in an axial line and are all on the same side of the teeth. While the steps 3 are shown as provided in all of the five teeth shown, they could be omitted from the outer teeth and provided only in the middle of the worm. However, in cutting such a gear it will probably be easier to make all teeth alike.

When such a worm is meshed with a driven worm wheel 4 as shown in Fig. 2 and the direction of rotation of the driving shaft I is in such a direction as to use the smooth or nonstepped sides of the teeth I as the driving surface, as represented, the driving action is that of an ordinary worm gear drive. Thus, in Fig. 2, normal driving action is obtained when the worm turns clockwise looking at it from the right-hand end and drives pinion 4 clockwise as indicated by the arrow thereon. Fig. 3 represents the same gearing in locking condition when attempt is made to reverse the direction of rotation of the worm.

In Fig. 3 the stepped sides of the worm teeth are the driving surfaces and it is apparent that as soon as the steps 3 approach the teeth of worm wheel 4, such steps will engage the flat lateral side surfaces of the teeth in 4 and block the worm 2 from further rotation in such direction. Thus, in Fig. 3, the worm 2 has been rotated counterclockwise looking at it from its right-hand end, driving worm wheel 4 in a counterclockwise direction as indicated by the arrow thereon until steps 3 in teeth I contact the back sides of teeth in 4 whereupon blocking action occurs. This is further represented in Fig. 4. With the steps 3 cut in the spiral forming the teeth I once per revolution as represented, the worm 2 cannot make more than one complete revolution in the blocking direction before it is stopped. It would be possible to reduce this to less than one revolution by providing two or more such blocking projections or steps in each convolution of the spiral ridge forming the teeth I, but this is generally unnecessary as one step per convolution answers the purpose. It is evident that only about the two central teeth of the worm 2 are here utilized in the driving and blocking actions for the size of the pinion 4 represented, and hence, the steps 3 might be confined to such central teeth. It is evident that in forming the steps 3 in teeth I, the teeth vary in thickness and are slightly thicker on one side of the step as at point 5, Fig. 1, than on the other side at point 6. The distance 7 between adjacent teeth where they are the thickest must be sufficient to allow the teeth of worm wheel 4 to pass therethrough without binding during normal driving operation, and hence, the general spacing of teeth I is made slightly greater than usual or the peripheral width of the teeth in pinion 4 is made slightly smaller than usual to provide a sufficiently loose meshing for satisfactory driving operation. The proportioning represented in the drawing is satisfactory. Here the projections extend into the space between adjacent worm teeth on the order of about ⅛ the average spacing distance.

A normal worm gear may be modified to utilize this invention as by welding small blocking projections 8, lugs or the like on one side of the teeth in a normal worm and leaving the mesh between the worm and driving worm wheel fairly loose as represented in Fig. 5.

What I claim as new and desire to secure by Letters Patent of the United States is:

1. One-way drive worm gearing comprising a worm having the driving sides of its teeth smooth and having blocking projections on the other sides of at least a portion of its teeth, said blocking projections being in axial alignment, a worm wheel meshing with said worm, the meshing engagement being sufficiently loose to permit the teeth of the worm wheel to pass the blocking projections without binding when the direction of drive is such that the smooth sides of the worm teeth engage in driving relation with the teeth in the driven worm wheel, said blocking projections engaging the sides of teeth in the worm wheel to block drive in the opposite direction when such opposite direction of drive is attempted.

2. A worm for use in one-way drive worm gearing, said worm having teeth one side of which have smooth normal driving surfaces, and axially aligned blocking projections on the opposite sides of at least a portion of the teeth in said worm, said blocking projections projecting into the space between adjacent worm teeth a distance of the order of about one-eighth of the average width of such spacing.

ROBERT L. BOYLES.

REFERENCES CITED

The following references are of record in the file of this patent:

UNITED STATES PATENTS

| Number | Name | Date |
|---|---|---|
| 2,399,925 | Hewlett, Jr. | May 7, 1946 |